US 6,619,458 B2

(12) United States Patent
Mehta et al.

(10) Patent No.: US 6,619,458 B2
(45) Date of Patent: Sep. 16, 2003

(54) PIVOT POINT RELEASE LOAD ADJUSTER ASSEMBLY FOR USE IN A PULL TYPE ANGLE SPRING CLUTCH PRESSURE PLATE ASSEMBLY

(75) Inventors: Vijay Krishan Mehta, New Delhi (IN); Ram Phal Dalal, Faridabad State of Haryana (IN); Ashok Kumar Singh, New Delhi (IN)

(73) Assignee: M/S. Clutch Auto Limited, New Delhi (IN)

( * ) Notice: Subject to any disclaimer, the term of this patent is extended or adjusted under 35 U.S.C. 154(b) by 36 days.

(21) Appl. No.: 09/808,422

(22) Filed: Mar. 13, 2001

(65) Prior Publication Data

US 2002/0130009 A1 Sep. 19, 2002

(30) Foreign Application Priority Data

Feb. 27, 2001 (IN) ...................... 192/DEL/2001

(51) Int. Cl.$^7$ .............................................. F16D 13/48
(52) U.S. Cl. ................... 192/70.29; 192/89.26
(58) Field of Search .......................... 192/70.25, 70.27, 192/70.3, 70.29, 89.26

(56) References Cited

U.S. PATENT DOCUMENTS

| | | | | |
|---|---|---|---|---|
| 1,513,203 A | * | 10/1924 | Wemp | 192/113.21 |
| 2,436,874 A | * | 3/1948 | Spase | 192/70.13 |
| 3,276,555 A | * | 10/1966 | Phelps | 192/70.27 |
| 3,394,788 A | * | 7/1968 | Sink | 192/89.26 |
| 3,539,047 A | * | 11/1970 | Hermanns | 192/70.3 |
| 3,667,582 A | * | 6/1972 | Borck et al. | 192/70.29 |
| 4,157,749 A | | 6/1979 | Sink et al. | |
| 4,760,906 A | | 8/1988 | Flotow et al. | |
| 4,936,432 A | | 6/1990 | Flotow | |
| RE34,105 E | | 10/1992 | Flotow et al. | |
| 5,373,927 A | | 12/1994 | Gochenour et al. | |
| 5,593,015 A | | 1/1997 | Kosumi et al. | |
| 5,901,614 A | | 5/1999 | Ewing | |
| 6,161,669 A | | 12/2000 | Lopez | |

FOREIGN PATENT DOCUMENTS

| | | |
|---|---|---|
| AU | 610877 | 5/1991 |
| AU | 626245 | 7/1992 |

OTHER PUBLICATIONS

"Clutch Assemblies" Miscellaneous illustrations.
"Cover Assemblies" Miscellaneous illustrations.
"Spicer Clutch Parts List" Spicer Catalog Oct. 1990, pp. 1–35.
Ace Manufacturing & Parts Co., Inc., Comfort Pedal.
Spicer Brochure "The Spicer System–Clutches".
Midland Comfort Pedal Clutch Data Sheet, 12/99.
Embragues Meritor ™ Brochure.
Eaton Spicer Solo Brochure, Eaton ® Spicer ®.
Rockwell LTD., Model Clutch Brochure, 1996.
Failure Analysis Guide, Medium & Heavy–Duty Clutches, Spicer System pp 1–24.

* cited by examiner

Primary Examiner—Christopher P. Schwartz
Assistant Examiner—Xuan Lan Nguyen
(74) Attorney, Agent, or Firm—Knobbe, Martens, Olson & Bear LLP

(57) ABSTRACT

A pivot point release load adjuster assembly for use in a pull type angle spring clutch pressure plate assembly having a pair of pins connected to the housing end, a cradle swivelingly disposed on the pins, a pressure spring seat swivelingly disposed on release sleeve retainer pins and a pressure spring located between the cradle on the housing end and the pressure spring seat on the release sleeve retainer end. The cradle is operatively positioned on the pins thereby enabling the cradle to swivel about a pivot axis at a distance, between the pressure spring seat and the pivot axis. The assembly is adapted to operatively adjust the pivot axis away from the seat of the pressure spring towards the sleeve retainer end of the pressure spring whereby a desired lever ratio is achieved.

10 Claims, 3 Drawing Sheets

PIVOT POINT RELEASE LOAD ADJUSTER ASSEMBLY FOR USE IN A PULL TYPE ANGLE SPRING CLUTCH PRESSURE PLATE ASSEMBLY

RELATED APPLICATIONS

This application claims the benefit of the Indian application No. 192/Del/2001 filed Feb. 27, 2001.

BACKGROUND OF THE INVENTION

1. Field of the Invention

The present invention relates to automobile clutches in general and more particularly to pivot point release load adjuster assembly for use in a pull type angle spring clutch pressure plate assembly.

2. Background of the Invention

Clutches are well known mechanisms used in automobiles, which are devices adapted to typically connect a driven means and a rotational power source. The rotational power source is usually the crankshaft of an automobile engine. A clutch device is having an engaged position and a disengaged position. Typically a plurality of springs is used to move the clutch pedal from an engaged position to a disengaged position. The plurality of springs requires a high magnitude of force to be exerted on the clutch pedal for arriving at the disengaged position. Consequently the operator of an automobile vehicle is required to exert a high amount of pressure on the clutch pedal frequently at the time of changing gears resulting in discomfort and fatigue after continuous driving for long durations. There are many examples of prior art pedal pressure minimizing clutch devices, but most of them involve complex and expensive mechanisms. These are prone to wear and tear thus subject to premature failure. Efforts to minimize the release load on the clutch pedal while maintaining a higher clamp load with a view to arrive at a better driving comfort have been going on and this objective has been well recognized and pursued continuously over the years.

The principle of using thrust springs at an angle to provide clamp load in clutches has been made applicable in many of the prior art pull type clutch devices. In pull type clutches employing thrust springs, a load is applied to the end of a lever so that in the release position the spring load is contained between the levers and the cover. The geometry changes as the clutch is released giving a change in the axial effort. Since the springs are located at each end, the constraints on the geometry together with the spring rate determines what changes in the angular load can be achieved. Applying this principle, spring loaded pull type clutch devices have been used to arrive at desired rates in the angular loads. However there are limitations in the known devices, necessitating further efforts to minimize the pedal pressure to a more comfortable level.

PRIOR ART REFERENCES

In the past, it has been well known to construct a clutch pressure plate assembly employing angle springs. Identical arrangements providing mechanical constructions directed to using thrust springs at an angle to provide clamp load in clutches can be found in U.S. Pat. No. 4,034,836, U.S. Pat. No. 4,157,749, U.S. Pat. No. 4,760,906, U.S. Pat. No. 4,936,432, U.S. Pat. No. 5,067,602, U.S. Pat. No. RE 34,105, and U.S. Pat. No. 5,373,927.

The arrangement shown in U.S. Pat. No. 4,034,836 provides for an improved connection for the release of levers. The improvement provides for opposed pivot and bearing portions on the levers with longitudinally extending ribs wherein the pivot portion is radially spaced. A sharp "knife edge" engages the pivot axis, the lug coacting to have a restraint so that the "knife edge" is maintained in contact with the pivot axis during the pivotal movement. The construction shown in U.S. Pat. No. 4,157,749 is identical to the above. These arrangements are structurally different from the disclosure made herein.

The construction shown in U.S. Pat. No. 4,760,906 is directed to an arrangement wherein three springs are circumferentially spaced equidistant about a release collar having radially extending ramped surfaces against which the assister springs engage and react. When the release collar is moved axially relative to the clutch cover, the assister springs are tilted away from the radial position. The arrangement shown in U.S. Pat. No. 4,936,432 is also an improvement in the construction of assister springs wherein spring seats are formed with the cover having V-shaped cross sections. The engagement spring seats are provided to pivotably pilot engagement springs for the clutch. In U.S. Pat. No. 5,067,602 the objective of the construction is to prevent excessive relative rotation, for which a plurality of protrusions are formed on the release sleeve retainer. In U.S. Pat. No. 5,373,927 the sleeve member is having an outwardly extending circumferential flange. The angled springs along with a plurality of axially extending spring members make the spring collector move towards the flange. All these arrangements are substantially different from the construction disclosed in the present invention.

SUMMARY OF THE INVENTION

The present invention relates to pivot point release load adjuster assembly for use in a pull type angle spring clutch pressure plate assembly wherein a novel assembly has been brought out to give greater flexibility in varying the axial load and in turn the release load to any desired configuration. A pin means and a cradle means have been devised so as to enable a swiveling movement of the cradle means on which the housing end of the pressure springs are mounted. The pin means is connected to the housing of the clutch assembly and the swiveling end of the pin means is having a pivoted contact surface on the cradle on which the springs are swivelingly mounted. This swiveling mechanism helps in obtaining the desired pivot point at a desired distance away from the spring seat on the swiveling end. The possibility of achieving the pivot point at such desired point away from the spring seat results in an increase in the lever ratio, consequently the release load is decreased and the pedal pressure is lowered. The goal of the present invention is therefore to bring down the pedal pressure to the desired minimum level thereby achieving better driving comfort.

Pressure springs are mounted on the pressure spring seat means on the sleeve retainer end. Pressure spring seat means have been provided on the release sleeve retainer with push pin means to help the pressure spring move in either direction.

Release sleeve retainer pin means are connected to the release sleeve retainer. The cradle has been provided on the housing end to help move the pressure springs as and when activations are made to disengage the clutch. Pressure spring seat means and release lever retainer pin means are used to keep the pressure springs axially in location as and when wear takes place on the pressure plate or any of the related parts thereof. A push type adjusting assembly has been used to adjust the setting height of clutches in the vehicles in the assembled condition. A replaceable brake disc has been provided to brake the clutch RPM.

BRIEF DESCRIPTION OF THE DRAWINGS

In order to have a fuller and more complete understanding of the nature and goal of the present invention, reference must be made to the following detailed description made in conjunction with the accompanying drawings, in which:

FIG. 1A shows the configuration of the side view of the pivot point release load adjuster assembly.

DETAILED DESCRIPTION OF A PREFERRED EMBODIMENT

Figure 1:
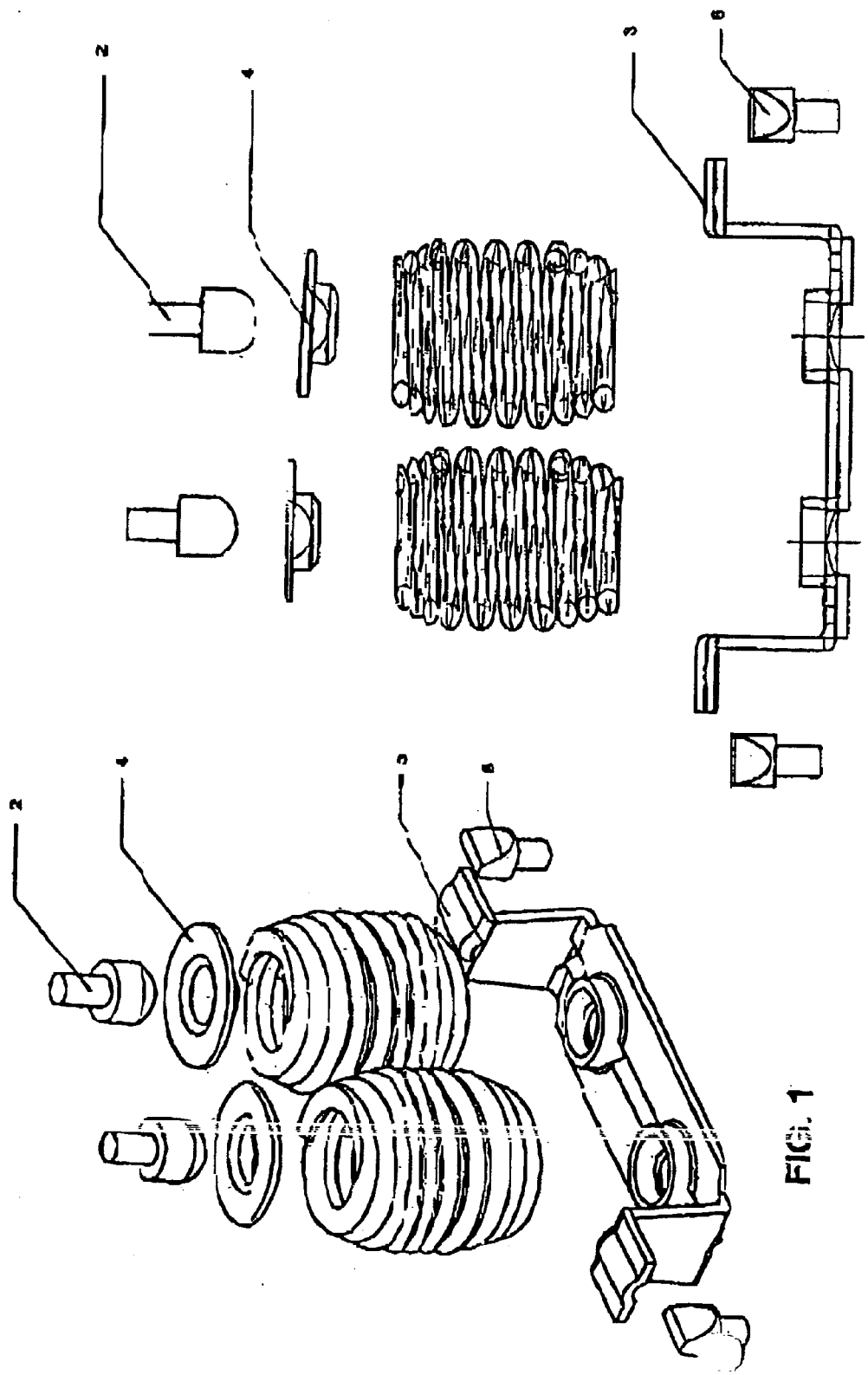
FIG. 1 shows the configuration of the top view of the pivot point release load adjuster assembly.
Figure 2:
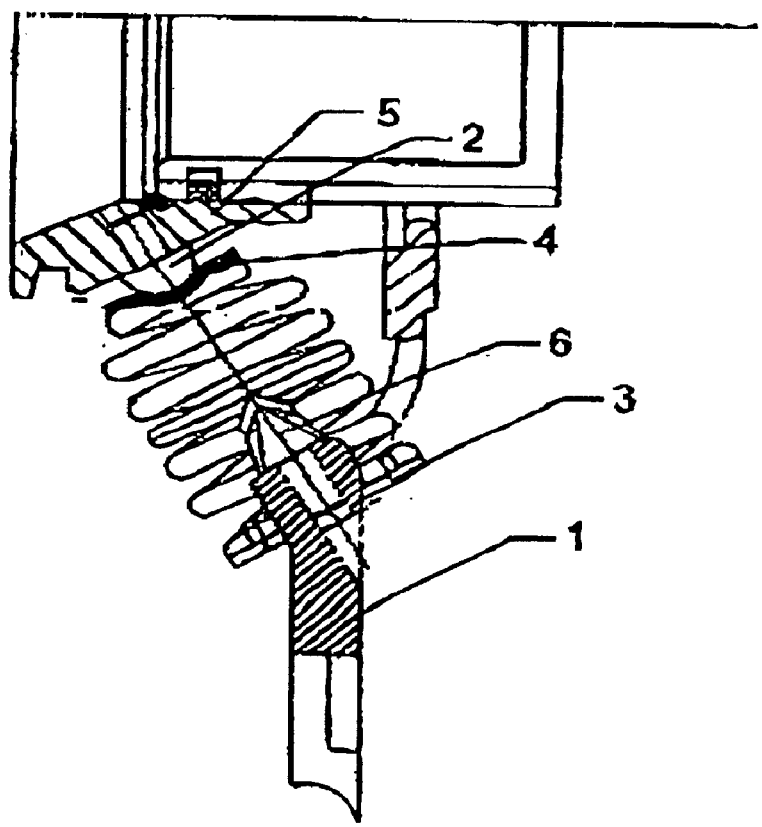
FIG. 2 shows the pivot point release load adjuster assembly with spring mounted on cradle on the housing end and on the pressure spring seat means on the release sleeve retainer end.
Figure 3:
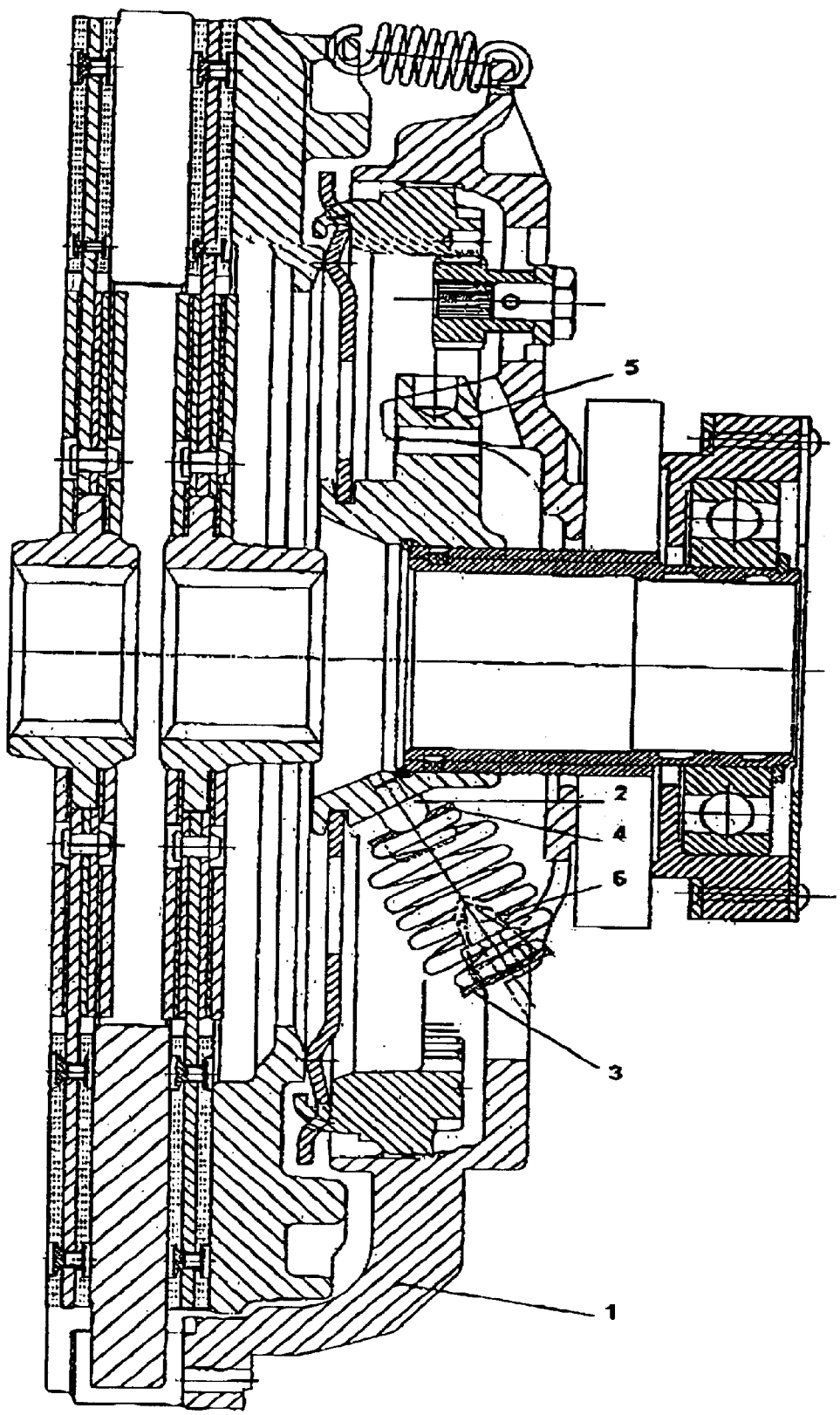
FIG. 3 is the sectional view of the improved embodiment of the pull type angle spring clutch pressure plate main assembly wherein the pivot point release load adjuster assembly is placed.

Referring now to the drawings, there is illustrated in FIG. 1, FIG. 1A, and FIG. 2 a pivot point adjuster assembly. FIG. 1 is the top view of the pivot point adjuster assembly whereas FIG. 1A is the side view. FIG. 3 shows the housing 1 formed of a single piece of gray cast iron. The main body of the housing 1 is generally annular in shape and is adapted to comprise the pivot point adjuster assembly. The pivot point adjuster assembly is having the pin means 6 and is made of steel which is hardened and tempered. All pin means (six in number) are connected to the housing 1. Pressure springs are located on the cradle 3 and it swivels about the hardened and tempered pin means 6, the bottom portion of the springs is seated on the cradle 3. Pressure spring seat means 4 are located on release sleeve retainer pin means 2. Pressure spring seat means 4 are pressed from low carbon sheet material. The release sleeve retainer pin means 2 are made of steel and are hardened and tempered and connected to release sleeve retainer 5.

An annular pressure plate is connected with the housing 1 by means of equi-spaced lug and slots arrangements. The lug and slots arrangements are conventional in the art and are provided to easily enter these parts in the housing to rotate and to drive the pressure plate thereby allowing the pressure plate to move axially relative to the housing. The pressure plate is hooked with the housing, the pressure plate being pulled by return springs fitted on the periphery of the housing. The pressure plate friction face is fine machined to have a better grip and to reduce the wear of the clutch lining fitted on the disc friction maternal. The pressure plate is fitted to transsmit the torque with the help of the clutch disc assembly, which is having an adjusting ring having outer threads to fit on the inner threads formed on the housing. Rotation of the adjusting ring relative to the housing causes axial movement of the adjusting ring. The adjusting ring is rotated manually by adjusting gear assembly to reset the height.

The levers are fitted on the adjusting ring to pressurize the pressure plate and are connected with release sleeve retainer groove to move the release sleeve, which is further locked with release sleeve half rings and snap ring on the end of the release sleeve and is fitted with deep groove ball bearing and locked with an external snap ring. Deep groove ball bearing is further locked by two release bearing spring to avoid loosening of the bearing during performance. Self-lubricating bush is provided inside the release sleeve to guide the clutch drive shaft. Two grease nipples are provided to fill high temperature grease and to provide nearest location to grease in the rotating complete assembly as fitted on the vehicle, between the bearing cage and deep groove ball bearing. A bearing cage cover to avoid entering of dust on the deep groove ball bearing is provided on the bearing cage assembly. Two bearing cage pads are employed for avoiding digging on the bearing cage during lifting the bearing cage by fork during disengagement of the clutch.

In accordance with the provisions of patent statutes, the substantive principle and the mode of operation of the present invention have been described and illustrated in the preferred embodiment. However, it must be construed that the present invention may be carried out and worked otherwise than as specifically described and illustrated with the support of drawings without deviating from its spirit and scope.

What is claimed is:

1. A pivot point release load adjuster assemble for use in a pull type angle spring pressure plate clutch assembly, comprising:

a cradle comprising a spring seat and having receiving ends defining a pivot axis wherein the spring seat is positioned a distance from the pivot axis so as to define a desired lever ratio therebetween;

a pair of pins connected at one end to a housing and another end pivotally connected to the receiving ends of the cradle, the pivot end of the pins being adapted to provide pivotal motion to the cradle when pressure is applied; and one or more pressure springs disposed on the spring seat of the cradle so as to apply pressure thereto wherein the cradle is operatively positioned on the pivotal end of the pins enabling the cradle to swivel about the pivotal end of the pins.

2. The pivot point release load adjuster assembly according to claim 1, wherein the cradle comprises at least one spring seat arranged for placing the pressure springs.

3. The pivot point release load adjuster assembly according to claim 1, wherein the pivotal end of the pins defines a tapered profile.

4. The pivot point release load adjuster assembly according to claim 3, wherein the receiving ends of the cradle are correspondingly contoured to the profile of the pivotal end of the pins.

5. The pivot point release load adjuster assembly according to claim 1, wherein the cradle is adapted to provide a seating location for the springs towards the housings end.

6. The pivot point release load adjuster assembly according to claim 1, wherein the pins are made of steel and are heat treated.

7. The pivot point release load adjuster assembly according to claim 1, wherein the pressure springs are seated on pressure spring seats swivelingly engaged with corresponding release sleeve retainer pins so as to define pivot points so as to enable the springs to swivel about the respective pivot points.

8. The pivot point release load adjuster assembly according to claim 1, wherein the cradle comprises heat-dissipating openings arranged at a housing end thereof.

9. In a pull type clutch pressure plate assembly having a housing, intermediate plate, pressure plate, release sleeve retainer, release levers, adjusting ring, return springs sleeve assembly, and pressure springs spaced between the housing and the release sleeve retainer, and a plurality of pivot point release load adjuster assemblies, a pivot point release load adjuster assembly comprising:

a cradle comprising a support plate and having receiving ends;

a pair of pins connected at one end to the housing and at another end pivotably connected to the receiving ends of the cradle, such that the pivotal, end of the pins provide pivotal motion to the cradle when pressure is applied thereto; and one or more pressure springs arranged on the cradle wherein the cradle is operatively positioned on the pivotal end of the pins enabling the cradle to swivel about the pivotal end of the pins and wherein distance between the pivotal end and the support plate of the cradle is so adjusted as to provide a desired lever ratio.

10. In the pull type clutch pressure plate assembly according to claim 9, wherein the housing has holes for placing the cradle and the pins to achieve a desired swiveling point.

* * * * *

UNITED STATES PATENT AND TRADEMARK OFFICE
CERTIFICATE OF CORRECTION

PATENT NO.      : 6,619,458 B2
DATED           : September 16, 2003
INVENTOR(S)     : Vijay Krishan Mehta, Ram Phal Dalal and Ashok Kumar Singh It is certified that error appears in the above-identified patent and that said Letters Patent is hereby corrected as shown below:

Column 4,
Line 22, please delete "assemble" and insert therefore, -- assembly --.
Line 31, please delete "pivot" and insert therefore, -- pivotal --.
Line 51, please delete "housings" and insert therefore, -- housing --.

Signed and Sealed this

Eighth Day of March, 2005

JON W. DUDAS
*Director of the United States Patent and Trademark Office*